(12) United States Patent
Tsien (10) Patent No.: US 7,546,421 B2
(45) Date of Patent: Jun. 9, 2009

(54) INTERCONNECT TRANSACTION TRANSLATION TECHNIQUE

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 11/200,341

(22) Filed: Aug. 8, 2005

(65) Prior Publication Data

US 2007/0033347 A1 Feb. 8, 2007

(51) Int. Cl.
*G06F 12/00* (2006.01)

(52) U.S. Cl. .................. 711/141; 711/133; 711/146

(58) Field of Classification Search .............. 711/133, 711/118, 141, 146
See application file for complete search history.

(56) References Cited

U.S. PATENT DOCUMENTS

| 5,926,832 | A   | * | 7/1999  | Wing et al. .............. 711/141 |
| 6,009,488 | A   |   | 12/1999 | Kavipurapu ............... 710/105 |
| 6,604,185 | B1  | * | 8/2003  | Fromm ..................... 711/207 |
| 2007/0055827 | A1 |   | 3/2007  | Tsien ...................... 711/141 |

* cited by examiner

*Primary Examiner*—Jasmine Song
(74) *Attorney, Agent, or Firm*—Trop, Pruner & Hu, P.C.

(57) ABSTRACT

A technique to reduce and simplify interconnect traffic within a multi-core processor. At least one embodiment translates two or more system operations destined for a processor core within a multi-core processor into a fewer number of operations to be delivered to the processor core and translates a response from the core into two or more system response operations corresponding to the two or more system operations.

24 Claims, 5 Drawing Sheets

INTERCONNECT TRANSACTION TRANSLATION TECHNIQUE

FIELD

Embodiments of the invention relate to microprocessor architecture. More particularly, some embodiments of the invention relate to a technique to translate a first interconnect transaction to a second interconnect transaction. Even more particularly, at least one embodiment relates to translating various transactions from a first interconnect to a second interconnect, in which the effect of the transactions from the first interconnect have the same effect on agents coupled to the second interconnect.

BACKGROUND

Computer systems are increasingly being designed using microprocessors with a number of processing cores ("multi-core processor") therein. A "core" is defined in this disclosure as an integrated circuit having at least one execution unit to execute to instructions, including, but not limited to, an arithmetic logic unit (ALU). In some multi-core processors, each core may be integrated with or may otherwise use a local cache memory to store data and/or instructions specific to a particular core. In order to maintain coherency between the local caches as well as other caches within the processor or computer system that may be accessed by the cores, logic may be associated with each local cache that implements a coherency protocol ("protocol engine").

In some multi-core processors, each processor core has an associated protocol engine to maintain coherency between the processor's local cache and other caches. However, in other multi-core processors, one protocol engine, or at least fewer protocol engines than the number of cores, is/are used to maintain coherency among all of the local caches and/or other caches within the processor or outside of the processor that may be accessed by the cores. In the latter case, information is typically communicated among the cores ("cache agents") or to devices ("agents") outside of the multi-core processor across an interconnect ("processor interconnect") via the protocol engine.

Figure 1:
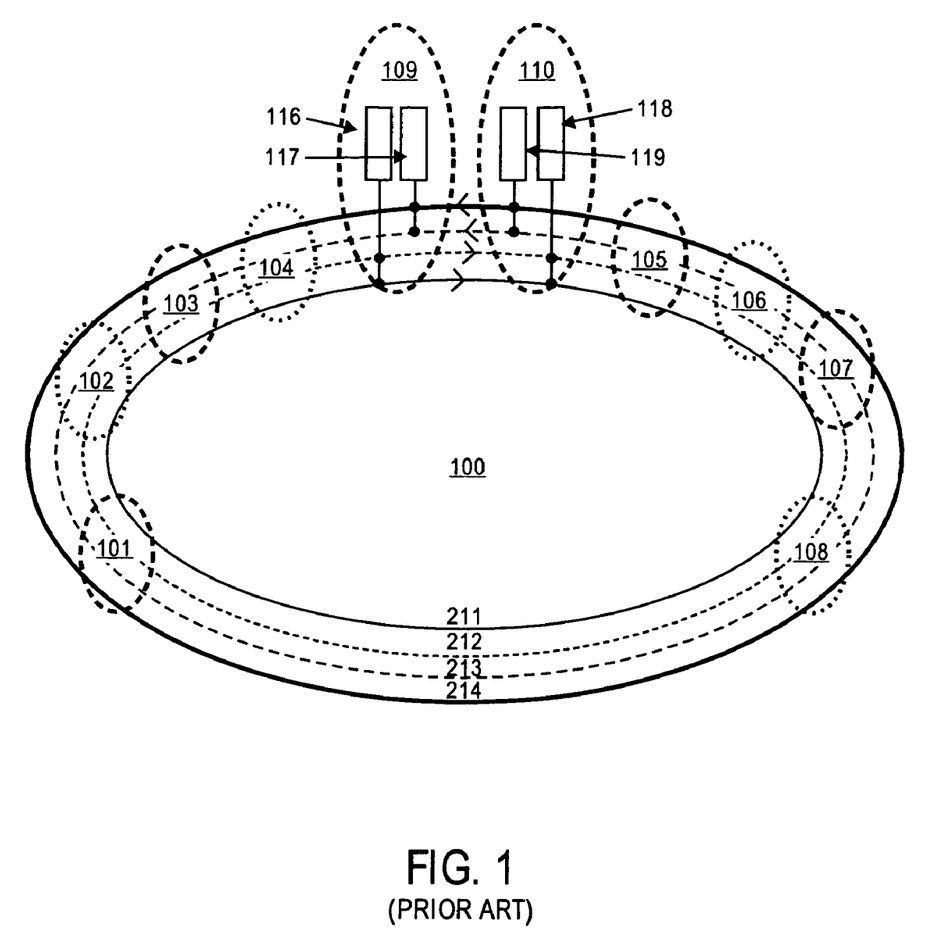
FIG. 1 is prior art organization of various cache agents within a multi-core processor that use a centralized protocol engine to maintain cache coherency.

FIG. 1 illustrates a prior art arrangement of cache agents within a multi-core processor that communicate via a centralized protocol agent that maintains coherency among the cache agents. In the arrangement illustrated in FIG. 1, caching transactions, such as data and/or cache ownership requests, data write-back operations, and other cache probe operations and responses are sent on rings 112 and 114 ("address" rings) and transactions, such as cache fill acknowledgements and cache probe responses, such as a cache "hit" or "miss" indication, are transmitted on rings 111 and 113 ("non-address" rings). In other arrangements the above or other transactional information may be transmitted on other combinations of the rings 111-114. Each set of cache agents communicates information between each other via protocol engine 110, which maintains cache coherency among the cache agents.

In some computer systems, especially those having a number of microprocessors (multi-core or single-core), the devices ("agents") within the computer system typically communicate via an interconnect ("system interconnect") according to a certain set of commands, rules, or protocol. For example, a point-to-point (P2P) computer system, in which no more than two agents share an interconnect, or "link", messages may be communicated among agents according to a common set of rules and control information. Typically, the same rules and control information used to communicate information among a number of agents within a P2P computer system are the same as those used to deliver information to or transmit information from cores of any multi-core processors within the P2P computer system.

Using the same communication rules and control information to communicate between agents on a system interconnect to/from cores on a processor interconnect can require the protocol engine or some other logic within, or otherwise associated with a multi-core processor, to implement the same communication rules and control information as the agents on the system interconnect. In some cases, this may require extra logic and may impede the efficiency of communication between the protocol engine and the various cores.

This may be particularly true if two or more communication rules or control information used to communication information on the system interconnect have the same effect on a core or cores on a processor interconnect. In this case, it may less-than-optimal, in terms communication cycles and/or logic, to communicate the information from the system interconnect to the processor interconnect using the same two or more communication information or rules to communicate from the system interconnect to a core or cores on the processor interconnect.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention pertain to microprocessor architecture. More particularly, some embodiments of the invention pertain to a technique to translate communication information from one interconnect to another. Even more particularly, at least one embodiment pertains to translating two or more communication operations from a system interconnect to at least one communication operation to transmit across a multi-core processor interconnect if the two or more operations from the system interconnect have substantially the same effect on a processor core within the multi-core processor.

Embodiments of the invention can result in improved system and processor performance efficiency by reducing the information that must be transmitted across a multi-core processor interconnect to deliver two or more operations originating from within a computer system interconnect to which the multi-core processor is coupled. For example, the rules and information needed to determine whether a certain data or instruction is present within a core's local cache, such as in a "snoop" operation, may be the same as a set of rules and information need to extract data from one agent within a computer system and provide it to another in order to resolve a conflict among two or more agents, such as in a "completion-forward" operation. In this case, the effect that the snoop and completion-forward operations have on a particular processor core is substantially the same—a core checks its local cache for the data and returns it to the requester if it contained within the core's cache. Therefore, the snoop and the completion forward from the system interconnect may be translated by the processor to whom it's addressed into one operation, such as a cache probe operation, and the addressed core(s) may respond accordingly. Likewise, the response from the addressed core(s) may be translated to an operation or operations consistent with the system interconnect transmission rules before returning the response to the originating agent.

Figure 2:
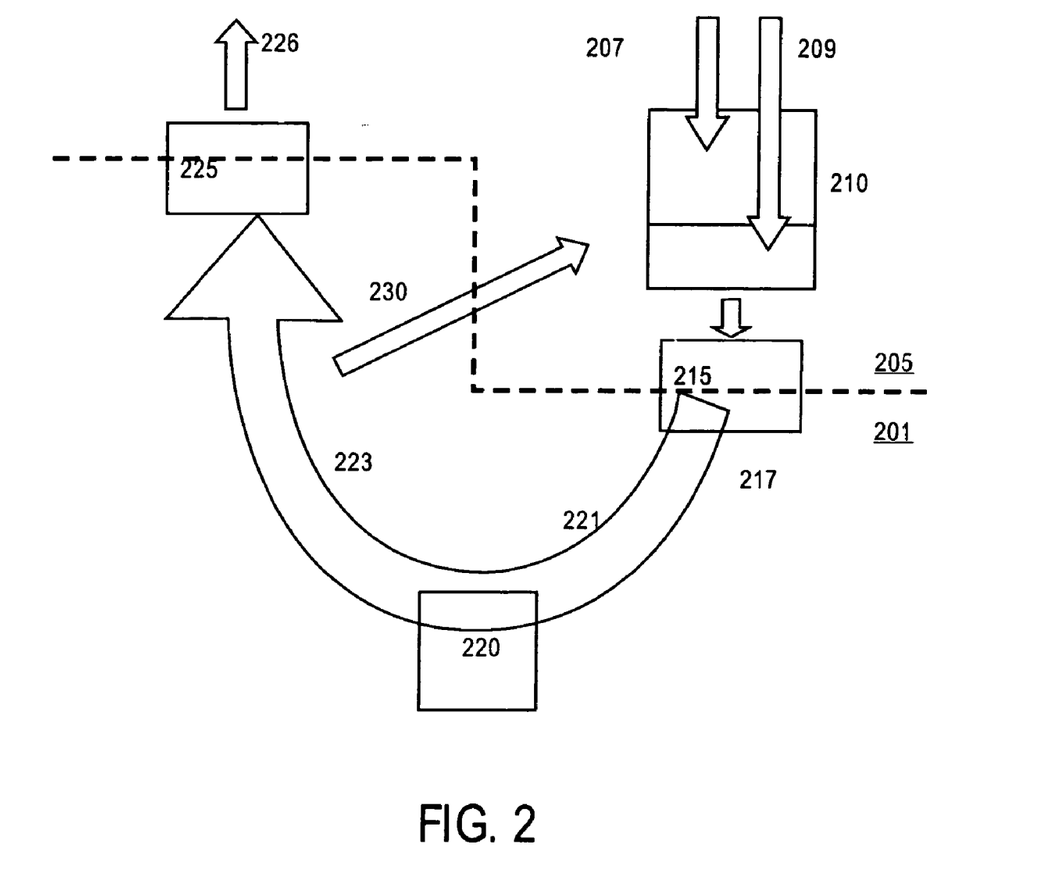
FIG. 2 is a diagram illustrating logical architecture that may be used to translate various transactions between cores on a processor interconnect and agents on a system interconnect, according to one embodiment of the invention.

FIG. 2 illustrates a logical architecture in which at least one embodiment of the invention may be implemented. Specifically, FIG. 2 illustrates a multi-core processor 201 coupled to a computer system interconnect 205, in which a snoop 207 and a completion-forward 209 operation are being transmitted from an agent within the computer system interconnect (not shown) via a staging area, such as a queue 210. The snoop and completion-forward operations may be detected by a first translation logic 215 within, or otherwise associated with, the multi-core processor and translated into a representative operation, such as a cache probe operation 217, which can be delivered to a core and/or a local cache associated with the core 220 within the multi-core processor along a multi-core processor interconnect 221. The core/cache can then perform the operation(s) prescribed by the cache probe, a cache lookup operation in this case, and return a result 223 to the first or a second translation logic 225 (which may be the same as the first translation logic in some embodiments), which can translate the cache probe response into one or more responses 226, corresponding to the snoop and completion-forward operations, consistent with the transmission rules and protocol of the system interconnect before transmitting the response to the intended recipient within the system interconnect.

In one embodiment, the translation of the snoop operation, completion-forwarding operation, and/or the cache probe response is performed by a protocol engine that maintains cache coherency between the cores of the multi-core processor. In other embodiments, other logic and/or software may perform the translation(s).

Because a cache probe response may result in different responses being sent across the system interconnect by the responding core(s), a copy of the snoop and completion-forward operations may be stored in the queue 210, along with a corresponding indicator to distinguish the responses from the core corresponding to the snoop operation from the responses from the core corresponding to the completion-forward operations. In one embodiment, an addressed core may indicate that a cache probe response corresponds to one of the snoop operation or the completion-forward operations.

In one embodiment, a bit is used and stored in or outside the queue to correspond to the snoop operations stored in the queue, such that a core that generates a response to a cache probe operation that corresponds to one of the snoop operations may look up the state of the bit so that the system interconnect can distinguish the operation (snoop or completion-forwarding operation) to which the cache probe response corresponds. This allows the response from the core(s) to be translated to an operation or operations consistent with the original system interconnect message.

In one embodiment, signal 230 is used to deallocate the snoop or completion-forward operation corresponding to the cache probe response in queue 210. This frees up the corresponding queue entry for another snoop or completion-forward operation to occupy its location. In one embodiment, signal 230 also returns a core/cache input buffer credit to allow the queue to use it and send another probe to the same core/cache.

Figure 3:
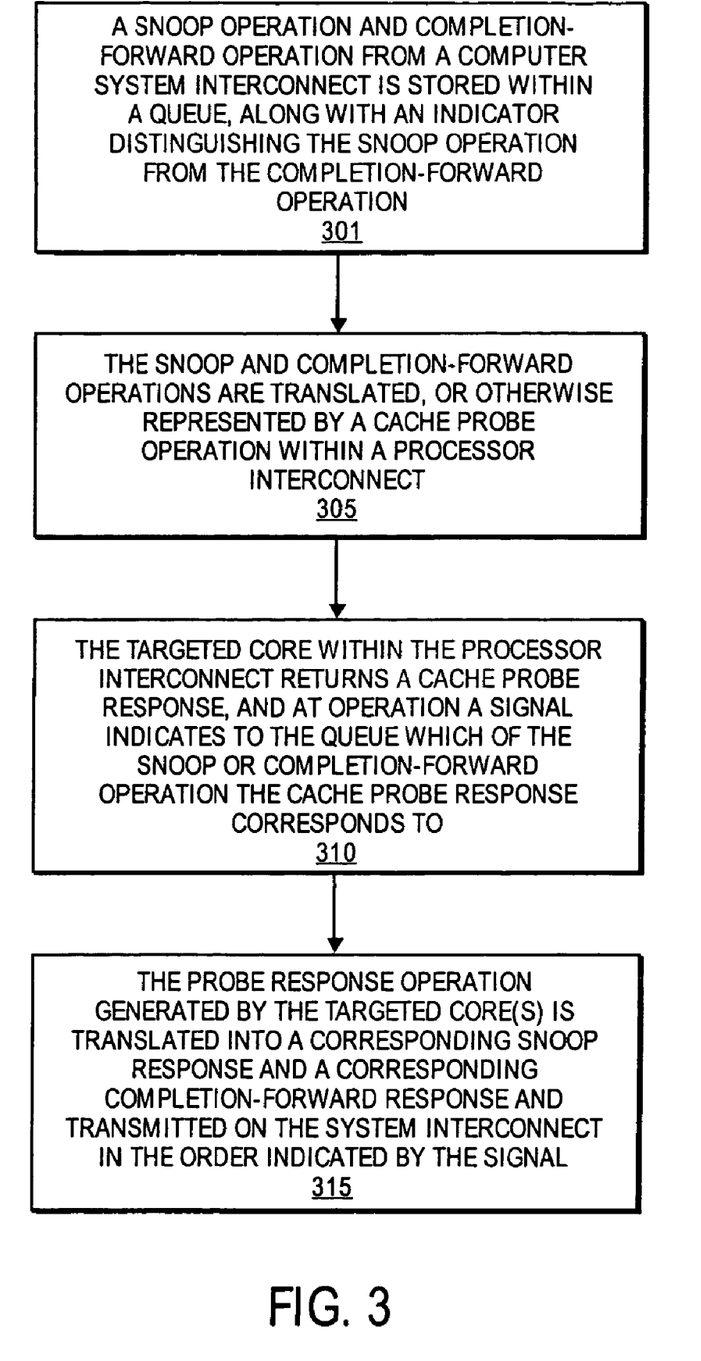
FIG. 3 is a flow diagram illustrating operations that may be performed in one embodiment of the invention.

FIG. 3 is a flow diagram illustrating various operations that may be used in one embodiment of the invention. Although the flow diagram describes operations that may be performed in an embodiment in which snoop operations and completion-forwarding operations are represented within a multi-core processor by the same operation, in other embodiments other (including more) operations originating within the computer system interconnect may be represented by at least one operation within the processor interconnect having substantially the same response by a processor core or cache being addressed by the system interconnect operations.

At operation 301, a snoop operation and completion-forward operation from a computer system interconnect is stored within a queue, along with an indicator distinguishing the snoop operation from the completion-forward operation. At operation 305, the snoop and completion-forward operations are translated, or otherwise represented by a cache probe operation within a processor interconnect. At operation 310, the targeted core within the processor interconnect returns a cache probe response, and at operation a signal indicates to the queue which of the snoop or completion-forward operations the cache probe response corresponds to. This allows the snoop or completion-forward operation type to be read out of the queue. In operation 315, the probe response operation generated by the target core(s) is used along with the snoop or completion-forward operation type indicated by the signal to generate the appropriate snoop or completion-forward response to the system interconnect.

In one embodiment of the invention, the computer system interconnect includes a point-to-point (P2P) network of electronic devices, including at least one multi-core processor. In particular, FIG. 4 shows a system where processors, memory, and input/output devices are interconnected by a number of point-to-point interfaces and communicate according to a certain set of rules and protocols to transmit information from one agent to another.

Figure 4:
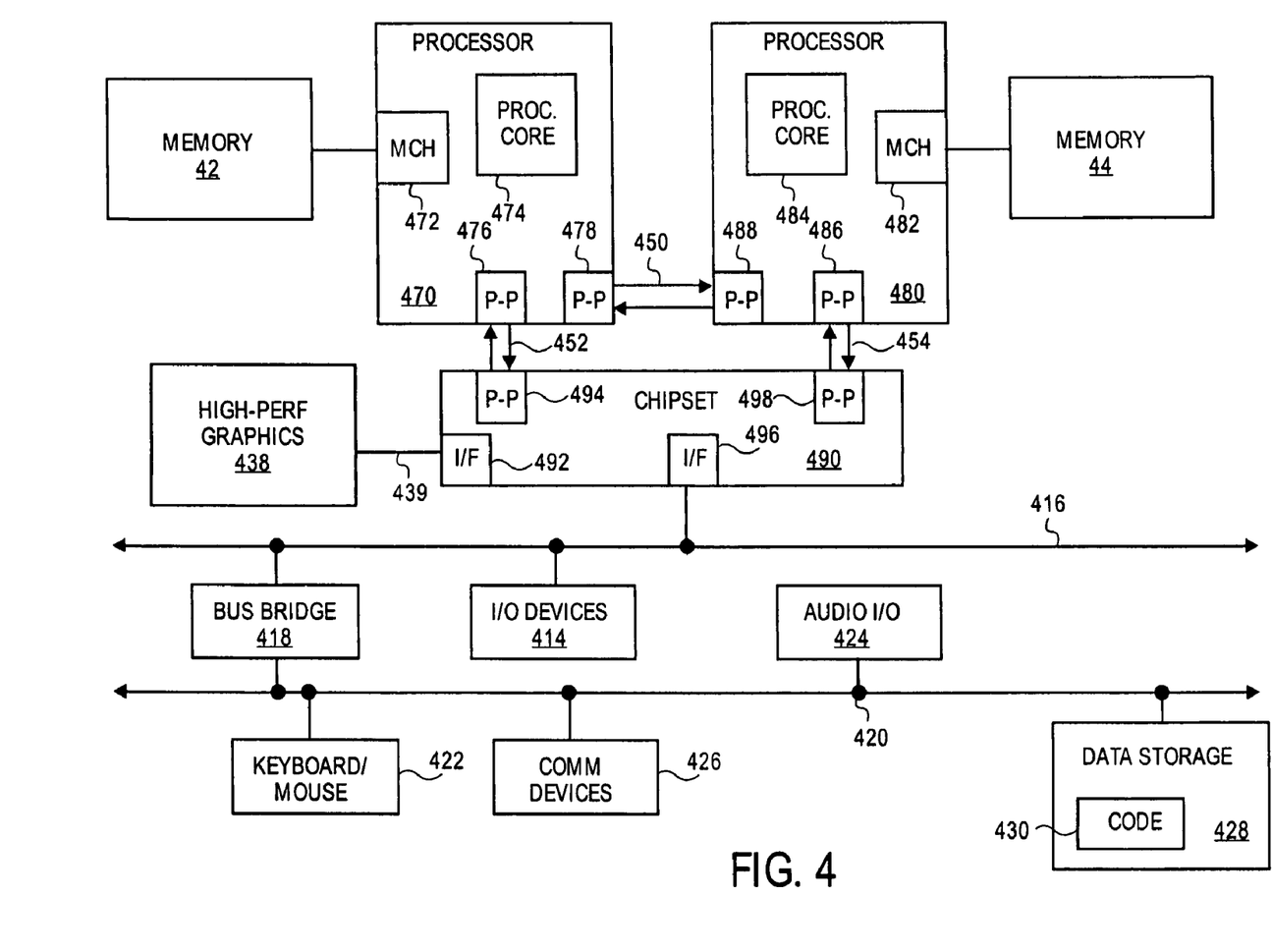
FIG. 4 is a point-to-point (P2P) interconnect computer system in which at least one embodiment of the invention may be used.

The system of FIG. 4 may also include several processors, of which only two, processors 470, 480 are shown for clarity. Processors 470, 480 may each include a local memory controller hub (MCH) 472, 482 to connect with memory 22, 24. Processors 470, 480 may exchange data via a point-to-point (PtP) interface 450 using PtP interface circuits 478, 488. Processors 470, 480 may each exchange data with a chipset 490 via individual PtP interfaces 452, 454 using point to point interface circuits 476, 494, 486, 498. Chipset 490 may also exchange data with a high-performance graphics circuit 438 via a high-performance graphics interface 439.

Either or both processors 470 and 480 may include multiple cores. Furthermore, at least one embodiment of the invention may be located within one or more of the processors 470 and 480, and in particular the point-to-point interface circuits 476, 478, 488, and 486. Other embodiments of the invention, however, may exist in other circuits, logic units, or devices within the system of FIG. 4. Furthermore, other embodiments of the invention may be distributed throughout several circuits, logic units, or devices illustrated in FIG. 4.

In one embodiment of the invention, the devices illustrated in FIG. 4 communicate using a first set of commands or operation codes ("opcodes"), whereas the cores included in processors 470 and 480 communicate with each other via second set of commands or opcodes. The following table is an example of a mapping between P2P computer system interconnect commands and cache probe commands used within a multi-core processor interconnect, according to one embodiment:

| System Cmd | Processor Cmd | Effect on Core/Cache |
|---|---|---|
| SnpInvOwn<br>Cmp_FwdInvOwn<br>Cmp_FwdCode | ExtractInval | Leaves a cache line in invalid state for all future requests for ownership. If the cache line was in exclusive state, data is extracted and returned to the protocol engine for forwarding to system agent |
| SnpInvItoE<br>Cmp_FwdInvItoE | ExtractMInval | Leaves cache line in invalid state and requires no data response. Unless data is modified, it is cleared from cache. |
| SnpCode<br>SnpData | ExtractSetShared | All cache lines in valid states are changed to shared state. Data data/code is read and returned to the protocol engine for forwarding to system agent |
| SnpCode | ExtractNoInval | Reads exclusively owned cache lines for which there is a "hit" without changing the cache state. |

In other embodiments, other system commands and/or processor commands may be mapped together to reduce the number of transactions to/from a processor core or cores. For example, in one embodiment, various system commands issued to a core within a processor may result in a change from a shared cache line state to an exclusive state. In this case, the system commands may be replaced with at least one processor core command that accomplishes the same result using fewer transactions on the processor interconnect than the system command on the system interconnect.

The cores within a processor may respond to a command with a certain result or results that is/are transmitted back to the original agent within the computer system that issued the command. Because the interconnect rules and information used to communicate among the various cores within a processor may be different from the corresponding system interconnect rules and information, the cores may respond with information or information formats not necessarily recognized by other agents residing on the system interconnect. For example, the following table summarizes some of the response that a core may generate in response to a command received by a protocol engine within a processor interconnect:

| Core Response | Description |
|---|---|
| InvalAck | Corresponds to either a "miss" or a change of cache state to a non-exclusively owned state after a probe of the cache invalidates a line without extracting data. Informs the protocol engine that no extraction of data has occurred. The protocol engine may translate this to a snoop response message to the system interconnect. |
| SharedAck | An indication to the protocol engine that a cache line is to remain in a shared state. The protocol agent may translate this to an transaction to the system interconnect that prevents the cache line from being exclusively owned by an agent within the system interconnect. |
| CleanAck | Indicates a non-modified data is read from a cache line is being transmitted to the protocol engine, which will indicate a "hit" condition. Because the data is non- |

-continued

| Core Response | Description |
|---|---|
| | modified, the protocol engine may infer that it was in an exclusively owned state and therefore respond to the system interconnect agent accordingly. |
| DirtyAck | Indicates modified data is read from a cache line is being transmitted to the protocol engine, which will indicate a "hit" condition. Because the data is modified, the protocol engine may not infer that it was in an exclusively owned state and therefore respond to the system interconnect agent accordingly. May also cause a writeback snoop response in certain cases. In any case the modified data will be removed from the cache or invalidated. |

Other responses from a core may be generated in other embodiments. In one embodiment of the invention, the result from a core to transmit back to the original agent within the computer system may need to be translated into a number of responses corresponding to the number and type of transactions sent by the agent. The following table summarizes some of the system transactions, the resultant probe transactions performed by the core(s), and the translation of the response(s) into snoop, writeback, and data response transactions compatible with the system interconnect:

| System Command | Core Response | Snoop System Response | Writeback System Response | Data System Response |
|---|---|---|---|---|
| SnpData | SharedAck | RspS | | |
| SnpCode | SharedAck | RspS | | |
| SnpCur | SharedAck | RspS | | |
| SnpInvOwn | CleanAck | RspFwdI | | Data_E |
| Cmp_FwdInvOwn | CleanAck | RspFwdI | | Data_E |
| SnpData | CleanAck | RspFwdS | | Data_F |
| SnpCode | CleanAck | RspFwdS | | Data_F |
| Cmp_FwdCode | CleanAck | RspFwdI | | Data_F |
| SnpCur | CleanAck | RspFwd | | Data_I |
| SnpInvOwn | DirtyAck | RspFwdI | | Data_M |
| Cmp_FwdInvOwn | DirtyAck | RspFwdI | | Data_M |
| SnpCode | DirtyAck | RspFwdSWb | WbMtoS | Data_F |
| Cmp_FwdCode | DirtyAck | RspIWb | WbMtoI | |
| SnpData | DirtyAck | RspFwdSWb | WbMtoS | Data_F |
| SnpInvItoE | DirtyAck | RspIWb | WbMtoI | |
| Cmp_FwdInvItoE | DirtyAck | RspIWb | WbMtoI | |

In the above table, the "snoop system response" column indicates the snoop response transaction that may occur as a result of the "core response" to the "system command". For example, a "RspS", may be an indication that the cache line accessed by the "SnpData", "SnpCode", or "SnpCur" system command is in a shared state, such that copies of the data stored therein may be accessed by a number of agents. In the case that a core cache line is addressed by a "SnpInvOwn", "Cmp_FwdInvOwn", "SnpData", "SnpCode", "Cmp_Fwd-Code", "SnpCur", "SnpInvOwn", or "Cmp_FwdInvOwn", followed by a "CleanAck" or "DirtyAck" core response, the core response may be translated into a number of "RspFwd" commands to indicate to the system agents within the system interconnect the resultant state of the cache line (e.g., invalid, shared state) along with the requested data and its state to be filled into the requester cache (e.g., modified, exclusively owned, shared forwarding).

Certain accesses from agents within the system interconnect can result in a writeback operation in addition to, or in lieu of, cache data being returned to the agent(s). For example, the table indicates that a "SnpCode", "Cmp_Fwd-InvOwn", "SnpData", "SnpInvltoE", or a "Cmp_FwdInvltoE" system command, followed by a "DirtyAck" response from the addressed core, may result in a system interconnect snoop response indicating the resultant state of the cache line (e.g., invalid, shared) and that a writeback operation is to occur (e.g., "RspFwdSWb", "RsplWb", "RspFwdSWb", "RsplWb", "RsplWb") in response. Likewise, the system interconnect writeback response may indicate the corresponding writeback operation and the corresponding resultant cache line state (e.g., "WbMtoS", "WbMtoI", "WbMtoS"), along with or in different cycles with the resultant data, if possible, and the requestor cache line fill state (e.g., forwarding) in the system interconnect data response (e.g., "Data_F").

In one embodiment, the snoop, writeback, and data responses may be transmitted across the system interconnect during the same clock cycles, but on different interconnect channels, or "links". In other embodiments, the snoop, writeback, and data responses may be transmitted across the system interconnect in different cycles in the same trace, or link, depending upon the particular system interconnect protocol being used.

Figure 5:
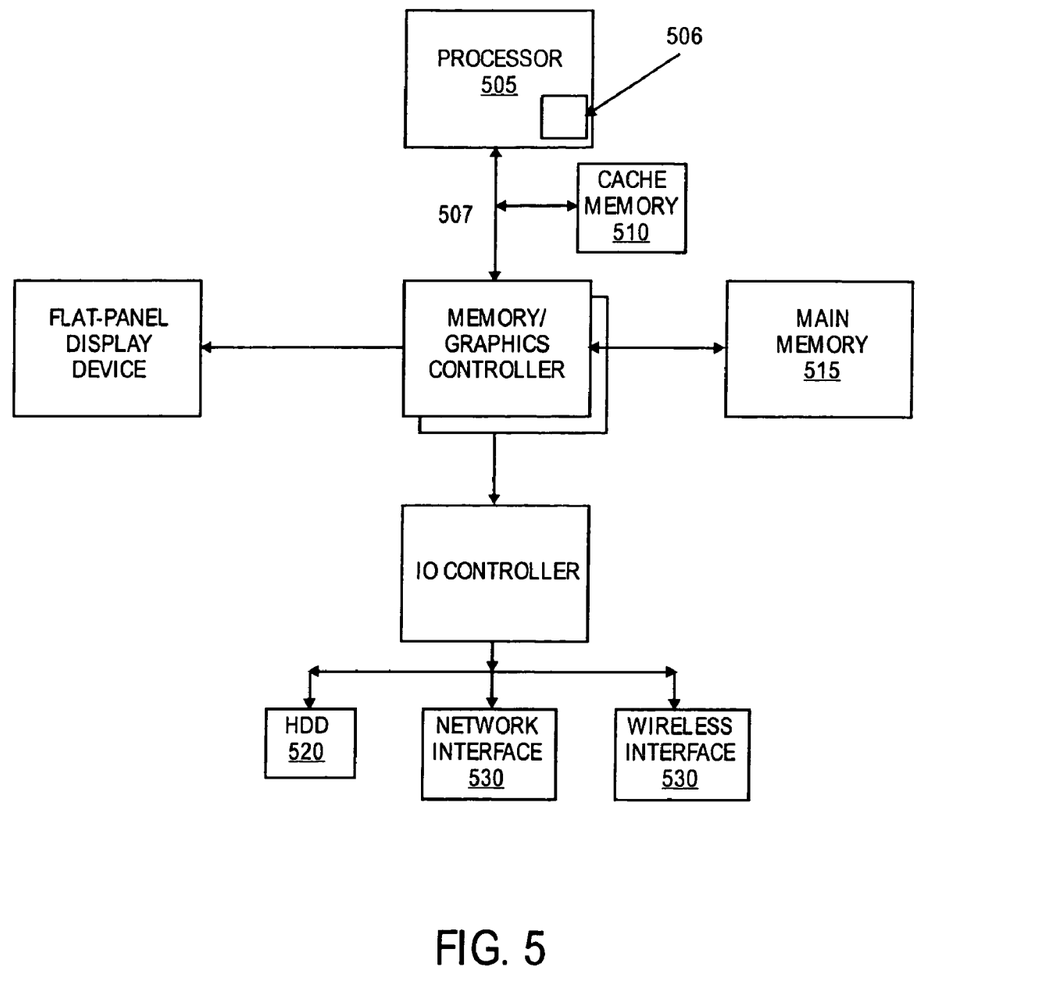
FIG. 5 is a shared interconnect computer system in which at least one embodiment of the invention may be used.

In addition to the P2P network illustrated in FIG. 4, at least one embodiment of the invention may be used in conjunction with a shared interconnect computer system. FIG. 5, for example, illustrates a front-side-bus (FSB) computer system in which one embodiment of the invention may be used.

A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache, which comprise an inclusive cache hierarchy in which coherency data is shared between the L1 and L2 caches. In other embodiments there may be more than 1 cache hierarchy.

Illustrated within the processor of FIG. 5 is one embodiment of the invention 506. Other embodiments of the invention, however, may be implemented within other devices within the system, such as the graphics controller, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507. Furthermore, the cache memory may contain relatively fast memory cells, such as a six-transistor (6T) cell, or other memory cell of approximately equal or faster access speed. Within, or at least associated with, each bus agent is at least one embodiment of invention 506, such that store operations can be facilitated in an expeditious manner between the bus agents.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A system comprising:
    a first system agent coupled to a system interconnect having a first communications protocol;
    a processor coupled to the system interconnect wherein the processor includes a core coupled to a processor interconnect having a second communications protocol;
    a first logic to translate a plurality of commands from the first system agent into a fewer number of commands to be delivered to the core, the fewer number of commands including a cache probe command to cause the core to check a local cache for requested data and if present therein, forward the requested data to the first system agent, and to translate a single response command from the core to a plurality of responses to the first system agent corresponding to the plurality of commands.

2. The system of claim 1 further comprising a queue of the system interconnect to store the plurality of commands until they are to be translated by the first logic into the fewer number of commands.

3. The system of claim 2, wherein the queue is to store an indicator bit to indicate which of the plurality of responses corresponds to which of the plurality of commands.

4. The system of claim 3, wherein the core is to access the indicator bit to generate a signal in order to indicate which of the plurality of commands the single response command corresponds to and to deallocate from the queue the command associated with the corresponding response.

5. The system of claim 1, wherein the system interconnect is a point-to-point interconnect.

6. The system of claim 1, wherein the system interconnect is a shared-bus interconnect.

7. The system of claim 1, wherein the processor is a multi-core processor having a plurality of cores.

8. The system of claim 7, wherein each of the plurality of cores has associated therewith a local cache to be used exclusively by one of the plurality of cores.

9. The system of claim 8, wherein the plurality of cores communicates via a single protocol engine.

10. A method comprising:
    storing at least two system operations transmitted across a computer system interconnect in a queue of the computer system interconnect;
    translating the at least two system operations into a single processor operation to be transmitted across a processor interconnect to reduce information to be transmitted across the processor interconnect, if the at least two system operations have substantially the same effect on a processor coupled to the processor interconnect;
    generating a response operation in the processor in response to the single processor operation;
    translating the response operation into at least two system response operations corresponding to the at least two system operations.

11. The method of claim 10 further comprising generating a signal to indicate to the queue which of the at least two system operations to which the response operation corresponds.

12. The method of claim 11, wherein if the signal corresponds to a first of the at least two system operations, a first of the at least two system response operations corresponds to the first of the at least two system operations.

13. The method of claim 12, wherein if the signal corresponds to a second of the at least two system operations, a second of the at least two system response operations corresponds to the second of the at least two system operations.

14. The method of claim 10, wherein the computer system interconnect comprises a point-to-point (P2P) interconnect.

15. The method of claim 14, wherein the P2P interconnect includes a plurality of links to transmit a plurality of response commands corresponding to the at least two system response operations, wherein the plurality of response commands include command types chosen from a list comprising: system snoop response, system writeback response, and system data response.

16. The method of claim 15, wherein the at least two system operations include a snoop command and a completion-forward command.

17. The method of claim 16, wherein the processor operation includes a cache probe command.

18. A processor comprising:
a plurality of processor cores including a plurality of local caches coupled together by a processor interconnect having a processor communication protocol;
a first logic comprising a protocol engine to facilitate communication among the plurality of processor cares by maintenance of cache coherency between the plurality of processor cores, wherein the first logic further comprises translation logic to map at least two commands sent from another agent coupled to the processor by a system interconnect having a system communication protocol to a target core of the plurality of processor cores into one command to be delivered to the target core if the at least two commands have substantially the same effect on the target core, and wherein the translation logic is to map a response command from the target core to the other agent into at least two response commands corresponding to the at least two commands.

19. The processor of claim 18, wherein the at least two commands correspond to a point-to-point interconnect protocol and wherein the one command corresponds to a processor core interconnect protocol that is different from the point-to-point interconnect protocol.

20. The processor of claim 18, wherein the at least two commands comprise a snoop command and a completion-forward command and the one command comprises a cache probe command.

21. The processor of claim 18, wherein the at least two response commands comprise information chosen from a group including: a resultant cache line state information, a writeback indicator, and cache line data.

22. A processor comprising:
a plurality of processor cores including a plurality of local caches coupled together by a processor interconnect having a processor communication protocol;
a first logic comprising a protocol engine to facilitate communication among the plurality of processor cores by maintenance of cache coherency between the plurality of processor cores, wherein the first logic further comprises:
first translation logic to map at least two commands sent from another agent coupled to the processor by a system interconnect having a system communication protocol to a target core of the plurality of processor cores into one command to be delivered to the target core if the at least two commands have substantially the same effect on the target core, and wherein the at least two commands are of a first set of commands used by the agent to communicate and the one command is of a second set of commands used by the plurality of processor cores to communicate;
second translation logic to map a response command from the target core to the other agent into at least two response commands corresponding to the at least two commands, and wherein the processor interconnect is to send a signal to the system interconnect to indicate to which of the at least two commands the one command corresponds, to enable the system interconnect to deallocate the corresponding one of the at least two commands.

23. The processor of claim 22, wherein the at least two commands correspond to a point-to-point interconnect protocol and wherein the one command corresponds to a processor core interconnect protocol that is different from the point-to-point interconnect protocol.

24. The processor of claim 22, wherein the at least two commands comprise a snoop command and a completion-forward command and the one command comprises a cache probe command.

* * * * *

UNITED STATES PATENT AND TRADEMARK OFFICE
CERTIFICATE OF CORRECTION

PATENT NO. : 7,546,421 B2  Page 1 of 1
APPLICATION NO. : 11/200341
DATED : June 9, 2009
INVENTOR(S) : Benjamin Tsien It is certified that error appears in the above-identified patent and that said Letters Patent is hereby corrected as shown below:

Column 9:
Line 26, "cares" should be --cores--.

Signed and Sealed this
Fourth Day of September, 2012

David J. Kappos
*Director of the United States Patent and Trademark Office*